(12) United States Patent
Niino et al.

(10) Patent No.: US 10,134,287 B2
(45) Date of Patent: Nov. 20, 2018

(54) VEHICLE DRIVE ASSIST SYSTEM AND VEHICLE DRIVE ASSIST METHOD

(71) Applicant: DENSO CORPORATION, Kariya, Aichi-pref. (JP)

(72) Inventors: Hiroaki Niino, Kariya (JP); Masayoshi Ooishi, Kariya (JP); Hiroshi Ishikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 147 days.

(21) Appl. No.: 15/309,773

(22) PCT Filed: May 7, 2015

(86) PCT No.: PCT/JP2015/063185
§ 371 (c)(1),
(2) Date: Nov. 8, 2016

(87) PCT Pub. No.: WO2015/174315
PCT Pub. Date: Nov. 19, 2015

(65) Prior Publication Data
US 2017/0249848 A1   Aug. 31, 2017

(30) Foreign Application Priority Data

May 13, 2014   (JP) ................................. 2014-099649

(51) Int. Cl.
*G05D 1/02*   (2006.01)
*B60W 30/16*   (2012.01)
(Continued)

(52) U.S. Cl.
CPC ............. *G08G 1/22* (2013.01); *B60W 30/165* (2013.01); *B60W 50/082* (2013.01);
(Continued)

(58) Field of Classification Search
CPC .... G08G 1/22; B60W 50/082; B60W 30/165; B60W 2750/308; B60W 2420/42; B60W 2540/12; B60W 2520/28; G05D 1/0295
See application file for complete search history.

(56) References Cited

U.S. PATENT DOCUMENTS 4,628,317 A * 12/1986 Nishikawa ........... B60K 26/021
                                                                180/169
5,594,645 A *  1/1997 Nishimura ......... B60K 31/0008
                                                                180/169
(Continued)

OTHER PUBLICATIONS

Machine Translation of JP 2007-069727 retrieved from espacenet on Jun. 25, 2018 (Year: 2018).*

*Primary Examiner* — Thomas Ingram
(74) *Attorney, Agent, or Firm* — Knobbe, Martens, Olson & Bear, LLP

(57) ABSTRACT

An automatic following control execution unit recognizes a preceding vehicle of the own vehicle and performs automatic following control of causing the own vehicle to automatically follow the preceding vehicle. A start-command acquisition unit acquires a start command to initiate the automatic following control. An automatic following control starting unit starts the automatic following control, when the brake is switched from on to off after satisfaction of a first to fifth conditions. The first condition is that the own vehicle is not under the automatic following control. The second condition is that a brake of the own vehicle is in an on state. The third condition is that the own vehicle is at rest. The fourth condition is that the preceding vehicle has been recognized. The fifth condition is that the start command acquisition means has acquired the start command. A target stopping inter-vehicle distance setting unit detects a first inter-vehicle distance between the own vehicle and the preceding vehicle when the first to fifth conditions are
(Continued)

satisfied, and sets, as the first inter-vehicle distance, a target inter-vehicle distance for stopping the own vehicle. A start timing setting unit detects a second inter-vehicle distance between the own vehicle and the preceding vehicle at the start of the automatic following control, and sets a start timing for starting the own vehicle on the basis of the second inter-vehicle distance.

7 Claims, 5 Drawing Sheets

(51) Int. Cl.
      *B60W 50/08*       (2012.01)
      *G08G 1/00*       (2006.01)
      *B60W 30/165*       (2012.01)

(52) U.S. Cl.
      CPC ....... G05D 1/0295 (2013.01); *B60W 2420/42* (2013.01); *B60W 2520/28* (2013.01); *B60W 2540/12* (2013.01); *B60W 2750/308* (2013.01)

(56) References Cited

U.S. PATENT DOCUMENTS

| | | | | |
|---|---|---|---|---|
| 6,185,499 | B1* | 2/2001 | Kinoshita | B60K 31/0008 180/179 |
| 2005/0137775 | A1* | 6/2005 | Sekiguchi | B60W 10/06 701/96 |
| 2007/0294020 | A1* | 12/2007 | Riegel | B60K 31/0008 701/96 |
| 2016/0207533 | A1* | 7/2016 | Uechi | G08G 1/166 |
| 2017/0309187 | A1* | 10/2017 | Lin | B60W 30/16 |

* cited by examiner

VEHICLE DRIVE ASSIST SYSTEM AND VEHICLE DRIVE ASSIST METHOD

CROSS-REFERENCE TO RELATED APPLICATION

This application is a U.S. National Phase Application under 35 U.S.C. 371 of International Application No. PCT/JP2015/063185 filed on May 7, 2015 and published in Japanese as WO 2015/174315 A1 on Nov. 19, 2015. This application is based on and claims the benefit of priority from Japanese Patent Application No. 2014-099649, filed May 13, 2014. The entire disclosures of all of the above applications are incorporated herein by reference.

TECHNICAL FIELD

The present invention relates to a vehicle drive assist system and a vehicle drive assist method.

BACKGROUND ART

In recent years, a vehicle drive assist system that performs drive assist, such as automatic following control, has been put to practical use. To obtain a driving feel reflecting preferences and habits of a driver during automatic following control, there is a proposed technique which learns data, such as a target inter-vehicle distance, while the driver is conducting following driving to use the data for automatic following control (see PTL 1 as follows).

CITATION LIST

Patent Literature

[PTL 1] JP-A-2005-178518

SUMMARY OF THE INVENTION

Technical Problem

According to the technique described in PTL 1, data is learned while the driver is driving following another vehicle. Therefore, the learning involves complicated logic.

The present invention has been made in light of the circumstances described above, and aims to provide a vehicle drive assist system and a vehicle drive assist method which can solve the problem set forth above.

Solution to Problem

A vehicle drive assist system of the present invention includes an automatic following control execution means recognizing a preceding vehicle of an own vehicle and performing automatic following control causing the own vehicle to automatically follow the preceding vehicle, a start command acquisition means acquiring a start command for initiating the automatic following control, a condition determination means determining whether or not a first condition, a second condition, a third condition, a fourth condition, and a fifth condition are satisfied, the first condition being that the own vehicle is not under the automatic following control, the second condition being that a brake of the own vehicle is in an on state, the third condition being that the own vehicle is at rest, the fourth condition being that the preceding vehicle has been recognized, and the fifth condition being that the start command acquisition means has acquired the start command, and a brake-off detection means detecting that the brake of the own vehicle has been switched from on to off.

The vehicle drive assist system of the present invention further includes an automatic following control starting means for initiating the automatic following control, when the brake of the own vehicle is switched from on to off after satisfaction of the first to fifth conditions, a target stopping inter-vehicle distance setting means for detecting a first inter-vehicle distance between the own vehicle and the preceding vehicle when the first to fifth conditions are satisfied, and setting, as the first inter-vehicle distance, a target inter-vehicle distance for stopping the own vehicle if the preceding vehicle stops during the automatic following control, and a start timing setting means for detecting a second inter-vehicle distance between the own vehicle and the preceding vehicle at start of the automatic following control, and setting a start timing for starting the own vehicle according to start of the preceding vehicle during the automatic following control, on the basis of the second inter-vehicle distance.

In a vehicle drive assist method of the present invention, a vehicle drive assist system installed in the own vehicle recognizes a preceding vehicle of an own vehicle and performs automatic following control causing the own vehicle to automatically follow the preceding vehicle. The vehicle drive assist system acquires a start command for initiating the automatic following control. The vehicle drive assist system determines whether or not a first condition, a second condition, a third condition, a fourth condition, and a fifth condition are satisfied, the first condition being that the own vehicle is not under the automatic following control, the second condition being that a brake of the own vehicle is in an on state, the third condition being that the own vehicle is at rest, the fourth condition being that the preceding vehicle has been recognized, and the fifth condition being that the start command acquisition means has acquired the start command. The vehicle drive assist system detects that the brake of the own vehicle has been switched from on to off. The vehicle drive assist system starts the automatic following control, when the brake of the own vehicle is switched from on to off after satisfaction of the first to fifth conditions. The vehicle drive assist system detects a first inter-vehicle distance between the own vehicle and the preceding vehicle when the first to fifth conditions are satisfied, and sets, as the first inter-vehicle distance, a target inter-vehicle distance for stopping the own vehicle if the preceding vehicle stops during the automatic following control. The vehicle drive assist system detects a second inter-vehicle distance between the own vehicle and the preceding vehicle at start of the automatic following control, and sets a start timing for starting the own vehicle according to start of the preceding vehicle during the automatic following control, on the basis of the second inter-vehicle distance.

According to the present invention, data used for automatic following control can be infallibly acquired by a simple logic.

DESCRIPTION OF EMBODIMENTS

With reference to the accompanying drawings, embodiments of the present invention will be described.

First Embodiment

1. Configuration of Vehicle Drive Assist System

Figure 1:
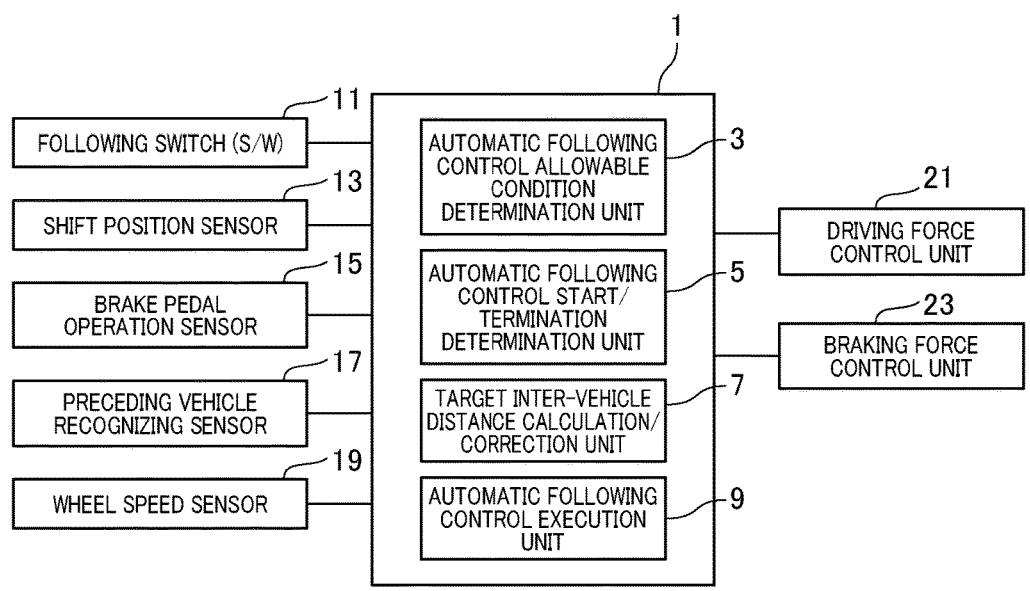
FIG. 1 is a block diagram illustrating a configuration of a vehicle drive assist system according to a first embodiment.

First, a configuration of a vehicle drive assist system will be described with reference to FIG. 1. A vehicle drive assist system 1 shown in FIG. 1 is an ECU (electronic control unit) installed in a vehicle (hereinafter referred to as the own vehicle). The vehicle drive assist system 1 has a known computer configuration including a CPU (central processing unit) and memories, such as a RAM (random access memory) and a ROM (read only memory), which are not shown.

The vehicle drive assist system 1 functionally includes an automatic following control allowable condition determination unit 3, an automatic following control start/termination determination unit 5, a target inter-vehicle distance calculation/correction unit 7, and an automatic following control execution unit 9. For example, the CPU of the vehicle drive assist system 1 implements the functions of the components mentioned above by executing programs set in memories, such as a ROM.

The functions of the automatic following control allowable condition determination unit 3, the automatic following control start/termination determination unit 5, and the target inter-vehicle distance calculation/correction unit 7 will be described later. The automatic following control execution unit 9 executes known automatic following control.

During the automatic following control, the own vehicle automatically follows a preceding vehicle (if the driver of the own vehicle does not perform driving operation). During the automatic following control, when the preceding vehicle stops, the own vehicle also stops, being distanced from the preceding vehicle by a target inter-vehicle distance set in advance. When the preceding vehicle firstly starts from the state where the own vehicle and the preceding vehicle are at rest, the own vehicle also starts at a start timing T determined on the basis of the inter-vehicle distance between the own vehicle and the preceding vehicle and a relative velocity of the preceding vehicle to the own vehicle.

The vehicle drive assist system 1 acquires signals from a following switch (s/w) 11, a shift position sensor 13, a brake-pedal operation sensor 15, a preceding vehicle recognizing sensor 17, and a wheel speed sensor 19.

The following switch 11 can be turned on/off by a driver of the own vehicle. The following switch 11 outputs a unique signal when switched from on to off or vice versa. The driver of the own vehicle can turn on the following switch 11 to instruct the system to start the automatic following control. The driver of the own vehicle turns off the following switch 11 to instruct the system to terminate the automatic following control.

The shift position sensor 13 detects a shift position of the own vehicle, and outputs a signal according to the detected shift position.

The brake-pedal operation sensor 15 detects a driver's operation of the brake pedal of the own vehicle. When the driver steps on the brake pedal (i.e., when the brake is in an on state), the brake pedal operation sensor 15 outputs a signal accordingly. When the driver is not stepping on the brake pedal (i.e., when the brake is in an off state), the brake pedal operation sensor 15 outputs a signal accordingly.

The preceding vehicle recognizing sensor 17 includes a camera, a millimeter wave sensor, and the like, and recognizes a preceding vehicle to calculate an inter-vehicle distance between the own vehicle and the preceding vehicle. The preceding vehicle recognizing sensor 17 acquires a variation with time of the inter-vehicle distance, and calculates a relative velocity of the preceding vehicle to the own vehicle on the basis of the variation. The preceding vehicle recognizing sensor 17 outputs a signal indicating the presence/absence of a preceding vehicle, the inter-vehicle distance between the own vehicle and a preceding vehicle, and the relative velocity of a preceding vehicle to the own vehicle.

The wheel speed sensor 19 detects a speed of the own vehicle, and outputs a signal indicating the speed. In particular, the wheel speed sensor 19 outputs a signal indicating that the speed is zero when the own vehicle is at rest.

The vehicle drive assist system 1 controls a driving force of the own vehicle by using a driving force control unit 21. The vehicle drive assist system 1 controls a braking force of the own vehicle by using a braking force control unit 23. In the automatic following control described above, the own vehicle is started, stopped, accelerated, and decelerated by using the driving force control unit 21 and the braking force control unit 23.

The automatic following control execution unit 9 is an example of the automatic following control execution means (or automatic following control execution unit). The automatic following control allowable condition determination unit 3 is an example of the start command acquisition means (or start command acquisition unit) and the condition determination means (or condition determination unit). The automatic following control start/termination determination unit 5 is an example of the brake-off detection means (or brake-off detection unit), the automatic following control starting means, and the automatic following control terminating means (or automatic following control terminating unit). The target inter-vehicle distance calculation/correction unit 7 is an example of the target stopping inter-vehicle distance setting means (or target stopping inter-vehicle distance setting unit), the start timing setting means (or start timing setting unit), and the map correction means (or map correction unit).

2. Processing Executed by the Vehicle Drive Assist System 1

(2-1) Process of Establishing Automatic Following Control Allowable Condition

Figure 2:
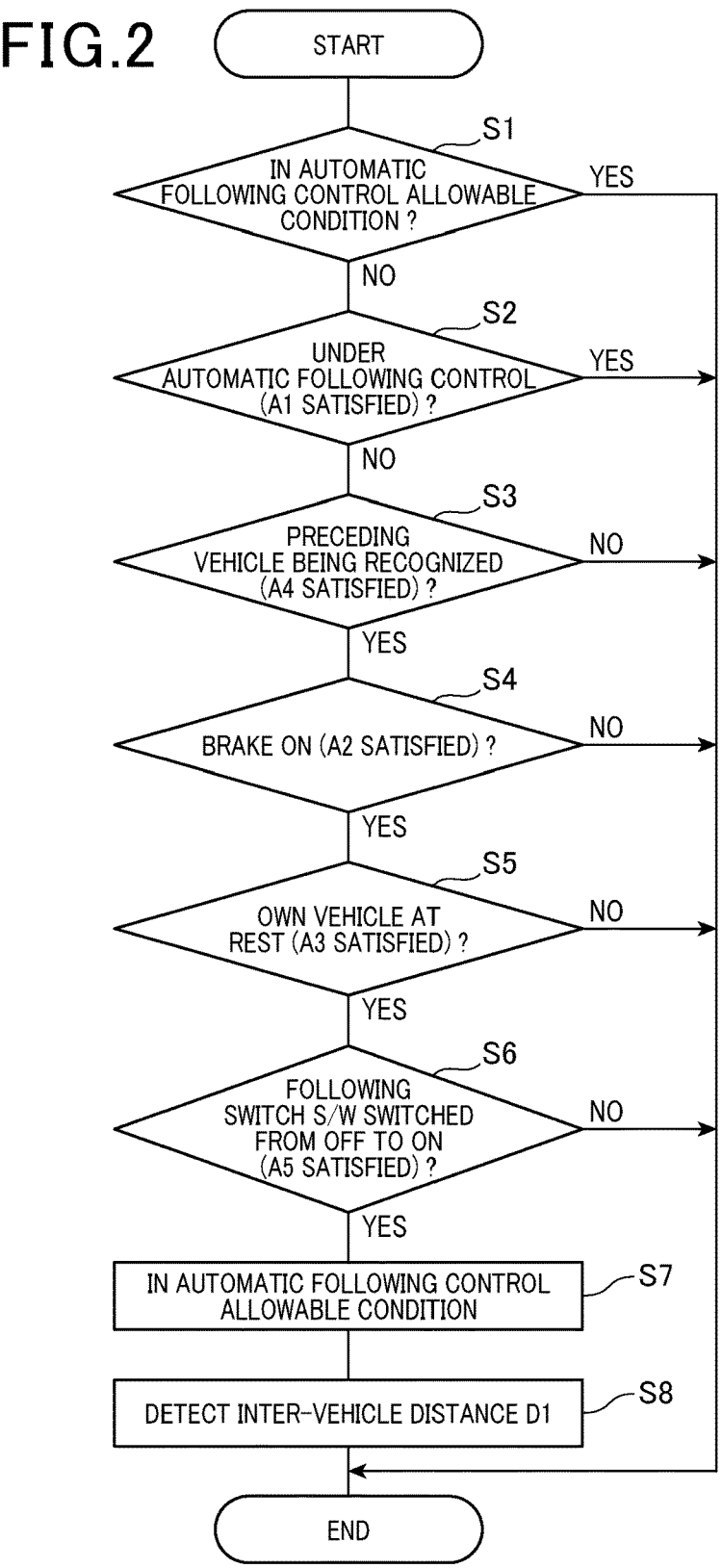
FIG. 2 is a flowchart illustrating a process of establishing an automatic following control allowable condition, performed by the vehicle drive assist system illustrated in FIG. 1.

With reference to FIG. 2, a process of establishing an automatic following control allowable condition will be described. This process is cyclically performed by the vehicle drive assist system 1 (in particular, by the automatic following control allowable condition determination unit 3).

In step S1, the vehicle drive assist system 1 determines whether or not the own vehicle is already in the automatic following control allowable condition. The automatic following control allowable condition is set in step S7 described below, and specifically refers to a condition of starting the automatic following control when the brake of the own vehicle is switched from on to off. As a result, if the own vehicle is not in the automatic following control allowable condition, control proceeds to step S2. If the own vehicle is in the automatic following control allowable condition, the present process is terminated.

In step S2, the vehicle drive assist system 1 determines whether or not the own vehicle is under the automatic following control. As a result, if the own vehicle is not under the automatic following control, control proceeds to step S3. If the own vehicle is under the automatic following control, the present process is terminated.

In step S3, the vehicle drive assist system 1 determines whether or not a preceding vehicle can be recognized by the preceding vehicle recognizing sensor 17. As a result, if a preceding vehicle can be recognized, control proceeds to step S4, but if it cannot, the present process is terminated.

In step S4, the vehicle drive assist system 1 determines whether or not the brake of the own vehicle is in an on state by using the brake pedal operation sensor 15. As a result, if the brake of the own vehicle is in an on state, control proceeds to step S5, but if it is in an off state, the present process is terminated.

In step S5, the vehicle drive assist system 1 determines whether or not the own vehicle is at rest, by using the wheel speed sensor 19. As a result, if the own vehicle is at rest, control proceeds to step S6, but if not (i.e., it is running), the present process is terminated.

In step S6, the vehicle drive assist system 1 determines whether or not the following switch 11 has been switched from off to on. In other words, the vehicle drive assist system 1 determines whether the following switch 11 has been in an off state in the processing of step S6 conducted last time and has been in an on state in the processing of step S6 conducted this time. As a result, if the following switch 11 is determined to have been switched from off to on, control proceeds to step S7. Otherwise, the present process is terminated.

In step S7, the vehicle drive assist system 1 establishes the automatic following control allowable condition.

In step S8, the vehicle drive assist system 1 acquires the inter-vehicle distance of the moment between the own vehicle and the preceding vehicle by using the preceding vehicle recognizing sensor 17, and defines the inter-vehicle distance as a first inter-vehicle distance D1.

The first inter-vehicle distance D1 is used as a target inter-vehicle distance when the own vehicle stops in response to stop of the preceding vehicle during automatic following control. In other words, when the preceding vehicle stops during automatic following control, the own vehicle also stops, being distanced from the stopped preceding vehicle by the first inter-vehicle distance D1.

The negative determination in step S2 is an example of satisfying the first condition A1. The affirmative determination in step S3 is an example of satisfying the fourth condition A4. The affirmative determination in step S4 is an example of satisfying the second condition A2. The affirmative determination in step S5 is an example of satisfying the third condition A3. The affirmative determination in step S6 is an example of satisfying the fifth condition A5. The automatic following control allowable condition is an example that the first to fifth conditions A1 to A5 have been satisfied.

(2-2) Process of Starting Automatic Following Control

Figure 3:
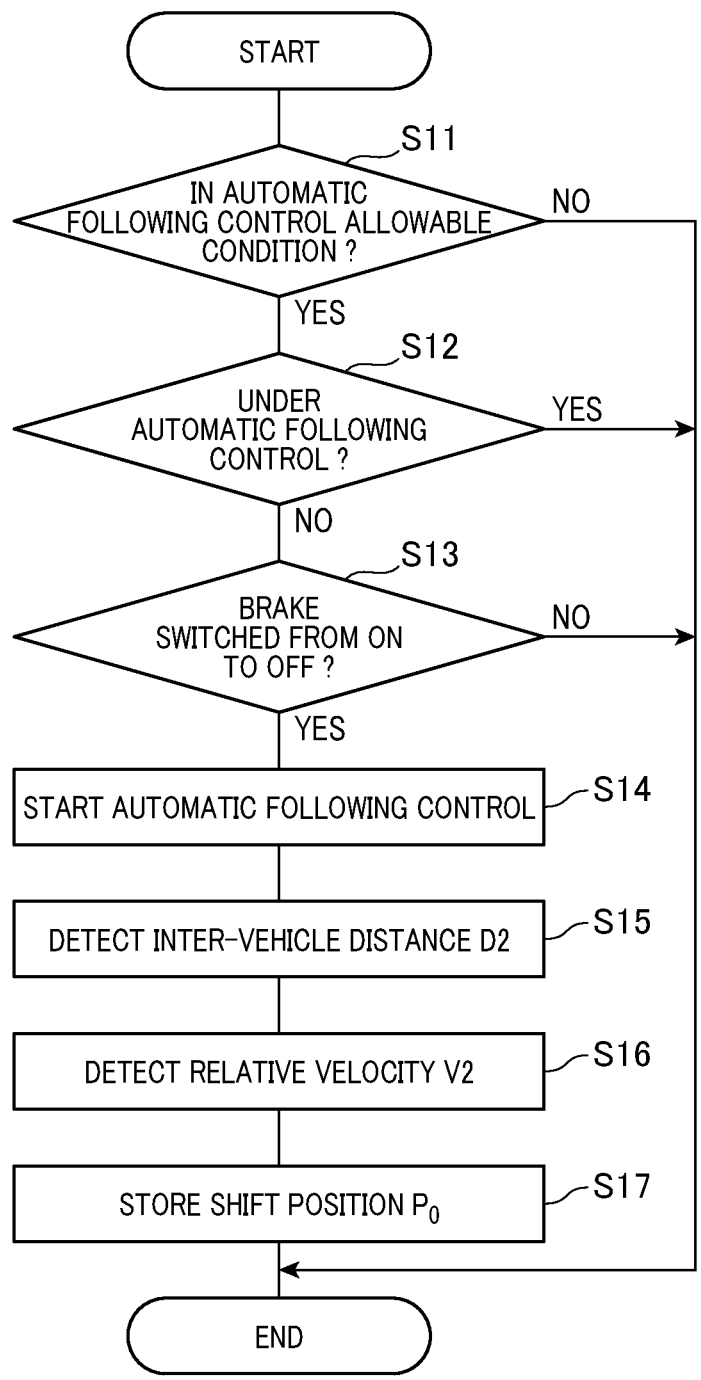
FIG. 3 is a flowchart illustrating a process of starting the automatic following control performed by the vehicle drive assist system illustrated in FIG. 1.

With reference to FIG. 3, a process of starting the automatic following control will be described. This process is cyclically performed by the vehicle drive assist system 1 (in particular, the automatic following control start/termination determination unit 5).

In step S11, the vehicle drive assist system 1 determines whether or not the own vehicle is in the automatic following control allowable condition. As a result, if the own vehicle is in the automatic following control allowable condition, control proceeds to step S12, but if not, the present process is terminated.

In step S12, the vehicle drive assist system 1 determines whether or not the own vehicle is already under automatic following control. As a result, if the own vehicle is not under automatic following control, control proceeds to step S13, but if under the automatic following control, the present process is terminated.

In step S13, the vehicle drive assist system 1 determines whether or not the brake of the own vehicle has been switched from on to off, by using the brake-pedal operation sensor 15. In other words, the vehicle drive assist system 1 determines whether or not the brake of the own vehicle has been in an on state in the processing of step S13 conducted last time and has been in an off state in the processing of step S13 conducted this time. As a result, if the brake of the own vehicle has been switched from on to off, control proceeds to step S14. Otherwise, the present process is terminated.

In step S14, the vehicle drive assist system 1 starts the automatic following control.

In step S15, the vehicle drive assist system 1 calculates a second inter-vehicle distance D2 between the own vehicle and the preceding vehicle at the time of starting the automatic following control, by using the preceding vehicle recognizing sensor 17.

In step S16, the vehicle drive assist system 1 calculates a relative velocity V2 of the preceding vehicle to the own vehicle at the time of starting the automatic following control, by using the preceding-vehicle recognizing sensor 17.

In step S17, the vehicle drive assist system 1 detects a shift position P0 of the own vehicle at the time of starting the automatic following control, by using the shift position sensor 13, and stores the shift position P0.

(2-3) Process of Terminating Automatic Following Control

Figure 4:
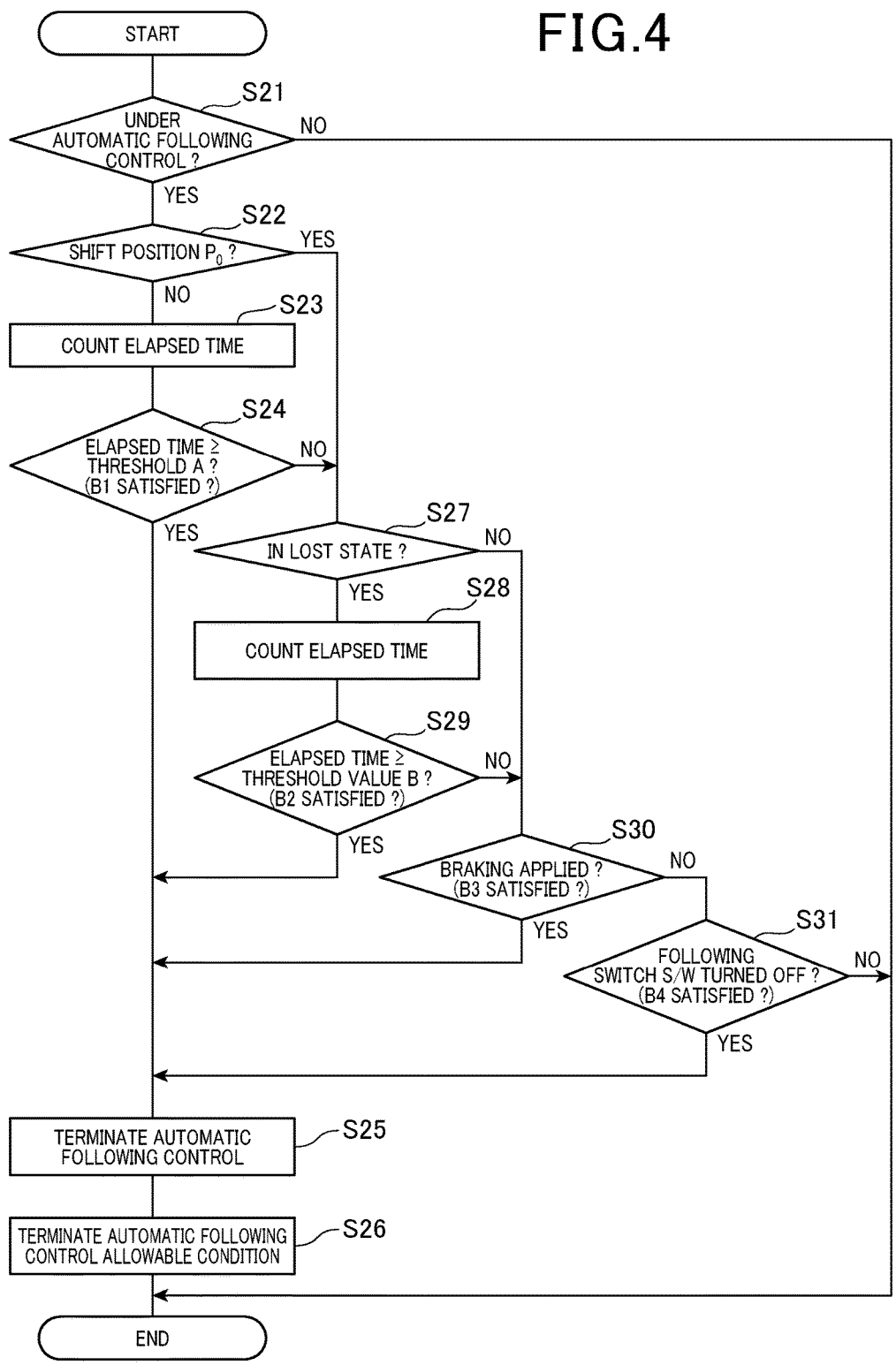
FIG. 4 is a flowchart illustrating a process of terminating the automatic following control performed by the vehicle drive assist system illustrated in FIG. 1.

With reference to FIG. 4, a process of terminating the automatic following control will be described. This process is cyclically performed by the vehicle drive assist system 1 (in particular, the automatic following control start/termination determination unit 5).

In step S21, the vehicle drive assist system 1 determines whether or not the own vehicle is under the automatic following control. As a result, if the own vehicle is under the automatic following control, control proceeds to the step S22, but if not, the present process is terminated.

In step S22, the vehicle drive assist system 1 detects a shift position of the own vehicle by using the shift position sensor 13, and determines whether or not the shift position matches the shift position P0 at the time of staring the automatic following control. As a result, if the detected shift position does not match the shift position P0, control proceeds to step S23, but if it matches, control proceeds to the step S27.

In step S23, the vehicle drive assist system 1 counts elapsed time from when the shift position has no longer come to match the shift position P0.

In step S24, the vehicle drive assist system 1 determines whether or not the elapsed time counted in step S23 is equal to or larger than a preset threshold A. As a result, if the count is not smaller than the threshold A, control proceeds to step S25, but if smaller than the threshold A, control proceeds to the step S27.

In step S25, the vehicle drive assist system 1 terminates the automatic following control.

In step S26, the vehicle drive assist system 1 terminates the automatic following control allowable condition.

On the other hand, if the determination in step S22 is affirmative or if the determination in step S24 is negative, control proceeds to the step S27. In step S27, the vehicle drive assist system 1 determines whether or not the own vehicle is in a state where a preceding vehicle cannot be recognized by the preceding-vehicle recognizing sensor 17 (lost state). As a result, if the own vehicle is in a lost state, control proceeds to the step S28, but if not, control proceeds to the step S30.

In step S28, the vehicle drive assist system 1 counts elapsed time from when the lost state has started.

In step S29, the vehicle drive assist system 1 determines whether or not the count in step S28 is equal to or larger than a preset threshold B. As a result, if the count is equal to or larger than the threshold B, control proceeds to step S25, but if smaller than the threshold B, control proceeds to the step S30.

In step S30, the vehicle drive assist system 1 determines whether or not the driver of the own vehicle has applied braking (i.e., has turned on the brake), by using the brake pedal operation sensor 15. As a result, if braking has been applied, control proceeds to step S25, but if not, control proceeds to step S31.

In step S31, the vehicle drive assist system 1 determined whether or not the following switch 11 has been switched from on to off. As a result, if the switch has been switched from on to off, control proceeds to step S25. Otherwise, the present process is terminated.

The affirmative determination in step S24 is an example of satisfying the sixth condition B1. The affirmative determination in step S29 is an example of satisfying the seventh condition B2. The affirmative determination in step S30 is an example of satisfying the eighth condition B3. The affirmative determination in step S31 is an example of satisfying the ninth condition B4.

(2-4) Process of Setting Start Timing T

First, the start timing T will be described in detail. As described above, when a preceding vehicle starts firstly, during the automatic following control, from a state where the own vehicle and the preceding vehicle are at rest, the own vehicle also starts at the start timing T. The start timing T is determined on the basis of the inter-vehicle distance between the own vehicle and the preceding vehicle and the relative velocity of the preceding vehicle to the own vehicle.

The target inter-vehicle distance calculation/correction unit 7 sets the start timing T as follows.

(i) When Initial Map M0 is Yet to be Corrected

The target inter-vehicle distance calculation/correction unit 7 is provided with an initial map Mo shown in 5. The initial map Mo is used for calculating the start timing T from the inter-vehicle distance D between the own vehicle and the preceding vehicle and the relative velocity V of the preceding vehicle to the own vehicle.

The initial map Mo defines a relationship between the relative velocity V and the inter-vehicle distance D. In the initial map Mo, for example, the inter-vehicle distance corresponding to an arbitrary relative velocity V is D(V).

Figure 5:
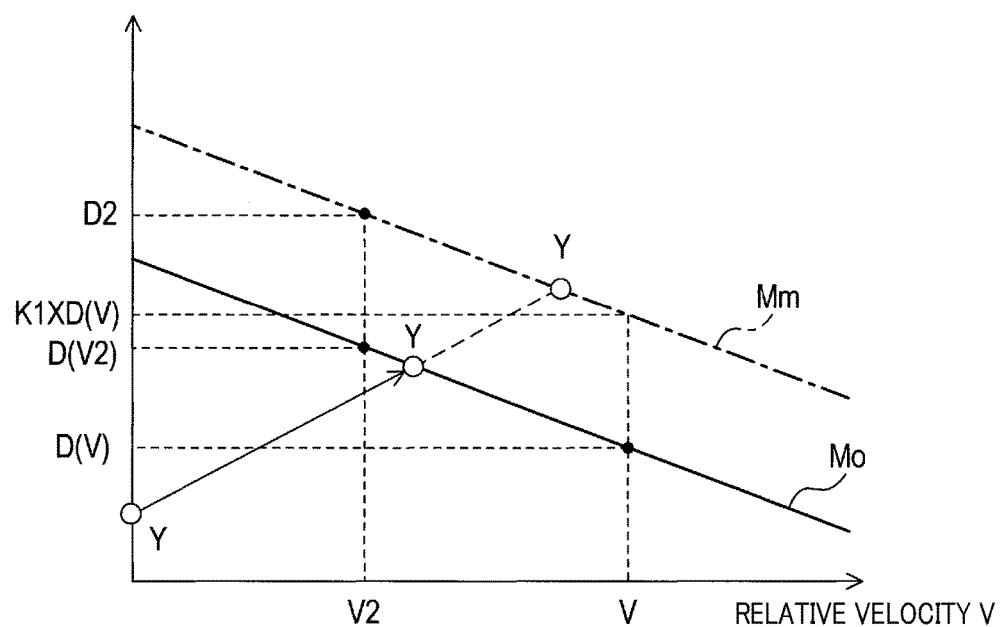
FIG. 5 is a graph illustrating an initial map and a corrected map.

Conditions of the own vehicle and the preceding vehicle (i.e., the relative velocity V and the inter-vehicle distance D) at an arbitrary time point are indicated by point Y in FIG. 5.

Under the conditions where the own vehicle and the preceding vehicle are at rest, the point Y is on the vertical axis (i.e., in a region where the relative velocity V is zero). Then, when the preceding vehicle is started while the own vehicle is at rest, the relative velocity V and the inter-vehicle distance D gradually increase, and the point Y moves in an upper-right direction as viewed in FIG. 5. The timing when the point Y eventually reaches the initial map Mo is the start timing T.

(ii) When Initial Map Mo has Already been Corrected

The target inter-vehicle distance calculation/correction unit 7 uses the second inter-vehicle distance D2 and the relative velocity V2 acquired in steps S15 and S16 to correct the initial map Mo and calculate a corrected map Mm shown in FIG. 5.

After calculating the corrected map Mm, the target inter-vehicle distance calculation/correction unit 7 further corrects the corrected map Mm using the second inter-vehicle distance D2 and the relative velocity V2 every time they are acquired in steps S15 and S16. This correction will be described later.

Similar to the initial map Mo, the corrected map Mm also defines a relationship between the relative velocity V and the inter-vehicle distance D, and is used for calculating the start timing T. In other words, after calculation of the corrected map Mm, the timing when the point Y has reached the corrected map Mm is taken as the start timing T.

(iii) Correction of Map

The target inter-vehicle distance calculation/correction unit 7 corrects the initial map Mo and calculates the corrected map Mm as follows by using the second inter-vehicle distance D2 and the relative velocity V2 acquired in steps S15 and S16.

On the initial map Mo, the inter-vehicle distance corresponding to the relative velocity V2 is defined as D(V2). Next, the target inter-vehicle distance calculation/correction unit 7 calculates a coefficient K1 using the following Formula (1).

$$K1 = D2/D(V2) \qquad \text{Formula (1)}$$

Then, the target inter-vehicle distance calculation/correction unit 7 prepares a corrected map Mm where an inter-vehicle distance with a value K1×D(V) corresponds to an arbitrary relative velocity V. A process of further correcting the corrected map Mm can also be performed in a manner similar to the above.

The initial map Mo may be corrected as follows. First, the target inter-vehicle distance calculation/correction unit 7 calculates a difference ΔD using the following Formula (2).

$$\Delta D = D2 - D(V2) \qquad \text{Formula (2)}$$

Then, the target inter-vehicle distance calculation/correction unit 7 prepares a corrected map Mm where an inter-vehicle distance with a value D(V)+ΔD corresponds to an arbitrary relative velocity V. A process of further correcting the corrected map Mm can also be performed in a manner similar to the above.

The initial map M0 may be corrected as follows. First, the target inter-vehicle distance calculation/correction unit 7 calculates a coefficient K2 using the following formula (3).

$$K2 = \Delta D/V2 \qquad \text{Formula (3)}$$

Then, the target inter-vehicle distance calculation/correction unit 7 prepares a corrected map Mm where an inter-vehicle distance with a value D(V)+K2×V corresponds to an arbitrary relative velocity V. A process of further correcting the corrected map Mm can also be performed in a manner similar to the above.

3. Advantageous Effects of Vehicle Drive Assist System 1

(1) The vehicle drive assist system 1 acquires the first inter-vehicle distance D1 when the own vehicle is at rest before start of the automatic following control (see step S8), and uses the first inter-vehicle distance D1 for the automatic following control.

The vehicle drive assist system 1 acquires the second inter-vehicle distance D2 and the relative velocity V2 immediately after start of the automatic following control (see steps S15 and S16), and uses them for the automatic following control.

Thus, data used for the automatic following control can be accurately and reliably acquired with a simple logic.

(2) The vehicle drive assist system 1 establishes the automatic following control allowable condition, on condition that the own vehicle is at rest and the brake is in an on state. Thus, the own vehicle is safe and secure.

(3) The vehicle drive assist system 1 can set an at-rest target inter-vehicle distance and a start timing T according to the driver's preferences by using the first and second inter-vehicle distances D1 and D2 and the relative velocity V2 which have been learned from the driver's driving operation.

(4) The vehicle drive assist system 1 terminates the automatic following control, when a time of not less than a threshold has elapsed from when the shift position of the own vehicle has no longer come to match the shift position at the start of the automatic following control. Thus, the automatic following control can be appropriately terminated. Additionally, if the shift position is changed for a short time due to erroneous operation or the like, a situation where the automatic following control is terminated against the driver's desire is unlikely to be created.

Other Embodiments (1) The start timing T may be set depending only on the inter-vehicle distance D, without relying on the relative velocity V. For example, consider a situation where the preceding vehicle is started first from the state where the own vehicle and the preceding vehicle are at rest, during the automatic following control. In this situation, the timing when the inter-vehicle distance D between the own vehicle and the preceding vehicle has reached a predetermined threshold C can be taken as the start timing T (without relying on the relative velocity V).

The vehicle drive assist system 1 may correct the threshold C on the basis of the inter-vehicle distance D acquired in step S15. For example, the inter-vehicle distance D acquired in step S15 can be used as the threshold C after correction.

(2) Instead of the following switch 11, another input device may be used. For example, a device which recognizes switching on or off based on the driver's speech may be used.

(3) The timing of correcting the initial map Mo or the corrected map Mm can be appropriately set. For example, the map may be corrected every time the second inter-vehicle distance D2 and the relative velocity V2 are acquired, or may be corrected based on history of corrections.

REFERENCE SIGNS LIST

1: vehicle drive assist system
3: automatic following control allowable condition determination unit
5: automatic following control start/termination determination unit
7: target inter-vehicle distance calculation/correction unit
9: automatic following control execution unit
11: following switch
13: Shift position sensor
15: Brake pedal operation sensor
17: Preceding vehicle recognizing sensor
19: Wheel speed sensor
21: Driving force control unit
23: Braking force control unit

The invention claimed is:

1. A vehicle drive assist system comprising:
an automatic following control execution means for recognizing a preceding vehicle of an own vehicle and performing automatic following control causing the own vehicle to automatically follow the preceding vehicle;
a start command acquisition means for acquiring a start command for initiating the automatic following control;
a condition determination means for determining whether or not a first condition, a second condition, a third condition, a fourth condition, and a fifth condition are satisfied,
the first condition being that the own vehicle is not under the automatic following control,
the second condition being that a brake of the own vehicle is in an on state, the third condition being that the own vehicle is at rest,
the fourth condition being that the preceding vehicle has been recognized, and
the fifth condition being that the start command acquisition means has acquired the start command;
a brake-off detection means for detecting that the brake of the own vehicle has been switched from on to off;
an automatic following control starting means for initiating the automatic following control, when the brake of the own vehicle is switched from on to off after satisfaction of the first to fifth conditions;
a target stopping inter-vehicle distance setting means for detecting a first inter-vehicle distance between the own vehicle and the preceding vehicle when the first to fifth conditions are satisfied, and setting, as the first inter-vehicle distance, a target inter-vehicle distance for stopping the own vehicle when the preceding vehicle stops during the automatic following control; and
a start timing setting means for detecting a second inter-vehicle distance between the own vehicle and the preceding vehicle at start of the automatic following control, and setting a start timing for starting the own vehicle according to start of the preceding vehicle during the automatic following control, on the basis of the second inter-vehicle distance.

2. The vehicle drive assist system according to claim 1, wherein:
the start timing setting means detects the second inter-vehicle distance and a relative velocity of the preceding vehicle to the own vehicle at the start of the automatic following control, and sets the start timing on the basis of the second inter-vehicle distance and the relative velocity.

3. The vehicle drive assist system according to claim 2, further comprising:
a map for use in calculating the start timing from an inter-vehicle distance between the own vehicle and the preceding vehicle and a relative velocity of the preceding vehicle to the own vehicle; and a map correction means correcting the map on the basis of the second inter-vehicle distance and the relative velocity detected by the start timing setting means, wherein the start timing setting means sets the start timing by using the corrected map.

4. The vehicle drive assist system according to claim 3, further comprising:

an automatic following control terminating means for terminating the automatic following control when any of a sixth condition, a seventh condition, an eighth condition, and a ninth condition is satisfied during the automatic following control, the sixth condition being that an elapsed time from when a shift position of the own vehicle has no longer come to match a shift position at the start of the automatic following control is equal to or longer than a predetermined threshold, the seventh condition being that elapsed time from when the preceding vehicle has no longer been recognized is equal to or longer a predetermined threshold, the eighth condition being that a driver of the own vehicle has applied braking, and the ninth condition being that a termination command for terminating the automatic following control has been acquired.

5. The vehicle drive assist system according to claim 2, further comprising:

an automatic following control terminating means for terminating the automatic following control when any of a sixth condition, a seventh condition, an eighth condition, and a ninth condition is satisfied during the automatic following control, the sixth condition being that an elapsed time from when a shift position of the own vehicle has no longer come to match a shift position at the start of the automatic following control is equal to or longer than a predetermined threshold, the seventh condition being that elapsed time from when the preceding vehicle has no longer been recognized is equal to or longer a predetermined threshold, the eighth condition being that a driver of the own vehicle has applied braking, and the ninth condition being that a termination command for terminating the automatic following control has been acquired.

6. The vehicle drive assist system according to claim 1, further comprising:

an automatic following control terminating means for terminating the automatic following control when any of a sixth condition, a seventh condition, an eighth condition, and a ninth condition is satisfied during the automatic following control, the sixth condition being that an elapsed time from when a shift position of the own vehicle has no longer come to match a shift position at the start of the automatic following control is equal to or longer than a predetermined threshold, the seventh condition being that elapsed time from when the preceding vehicle has no longer been recognized is equal to or longer a predetermined threshold, the eighth condition being that a driver of the own vehicle has applied braking, and the ninth condition being that a termination command for terminating the automatic following control has been acquired.

7. A vehicle drive assist method comprising:

recognizing, by a vehicle drive assist system installed in the own vehicle, a preceding vehicle of an own vehicle and performing automatic following control causing the own vehicle to automatically follow the preceding vehicle;

acquiring, by the vehicle drive assist system, a start command for initiating the automatic following control;

determining, by the vehicle drive assist system, whether or not a first condition, a second condition, a third condition, a fourth condition, and a fifth condition are satisfied, the first condition being that the own vehicle is not under the automatic following control, the second condition being that a brake of the own vehicle is in an on state, the third condition being that the own vehicle is at rest, the fourth condition being that the preceding vehicle has been recognized, and the fifth condition being that the start command acquisition means has acquired the start command;

detecting, by the vehicle drive assist system, that the brake of the own vehicle has been switched from on to off;

starting, by the vehicle drive assist system, the automatic following control, when the brake of the own vehicle is switched from on to off after satisfaction of the first to fifth conditions;

detecting, by the vehicle drive assist system, a first inter-vehicle distance between the own vehicle and the preceding vehicle when the first to fifth conditions are satisfied, and setting, as the first inter-vehicle distance, a target inter-vehicle distance for stopping the own vehicle when the preceding vehicle stops during the automatic following control; and detecting, by the vehicle drive assist system, a second inter-vehicle distance between the own vehicle and the preceding vehicle at start of the automatic following control, and setting a start timing for starting the own vehicle according to start of the preceding vehicle during the automatic following control, on the basis of the second inter-vehicle distance.

* * * * *